Feb. 17, 1953 R. W. AYRES ET AL 2,628,484
COMBINATION DRIER AND RESTRICTOR
FOR REFRIGERATION SYSTEMS
Filed Jan. 27, 1949
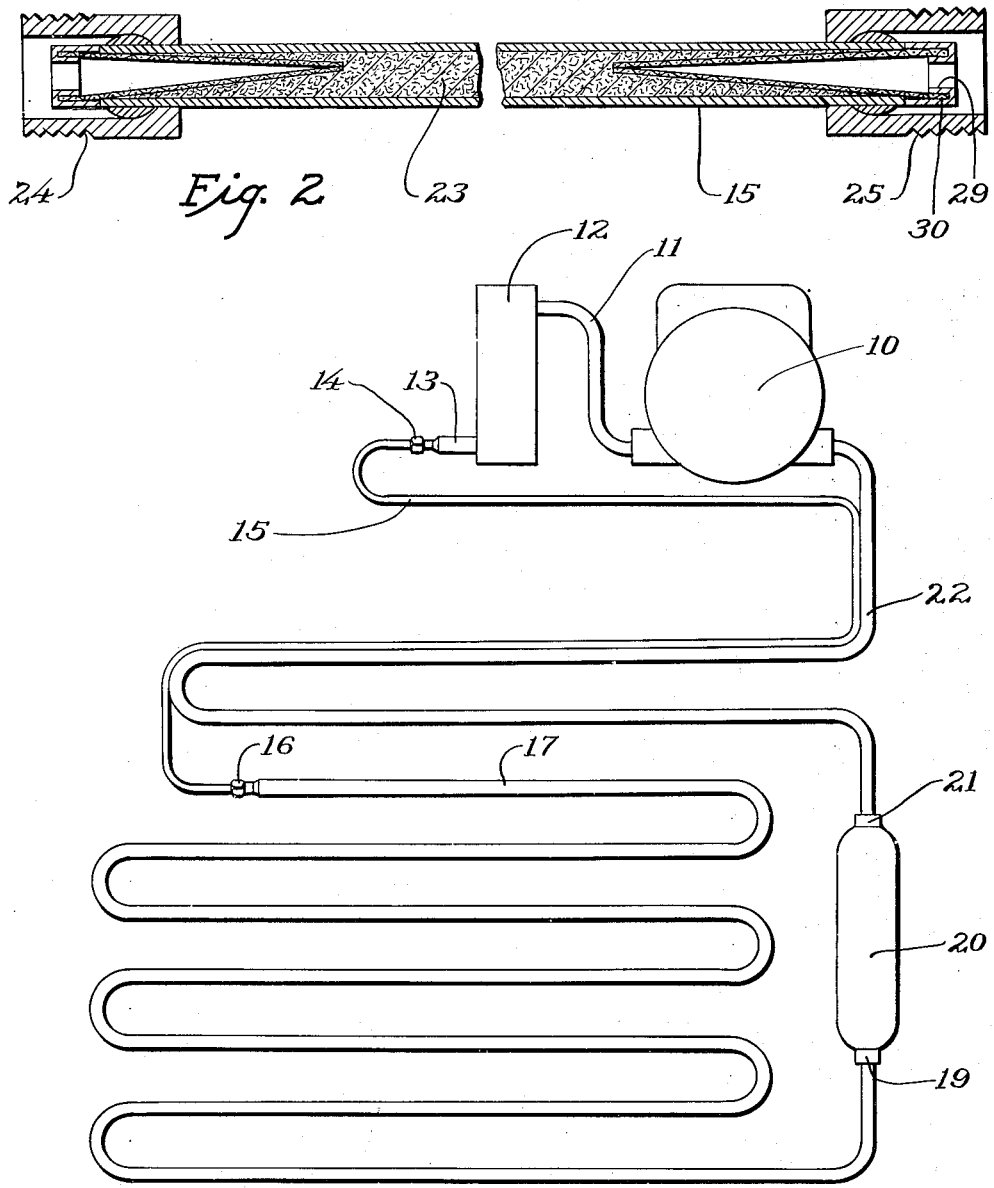
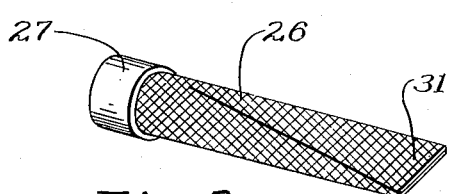
Inventor
Russell W. Ayres
Donald F. Swanson
By Robert M. Dunning Patented Feb. 17, 1953

2,628,484

UNITED STATES PATENT OFFICE 2,628,484

COMBINATION DRIER AND RESTRICTOR FOR REFRIGERATION SYSTEMS

Russell W. Ayres and Donald F. Swanson, St. Paul, Minn., assignors to Seeger Refrigerator Company, St. Paul, Minn.

Application January 27, 1949, Serial No. 73,042

4 Claims. (Cl. 62—117.85)

Our invention relates to an improvement in combination drier and restrictor for refrigeration systems and deals particularly in a device for restricting the flow of refrigerant through the system and also drying the gas to remove moisture therefrom.

Refrigeration systems usually employ a drier through which the refrigerant passes to remove any moisture from the system. Care is taken at the time the system is sealed to prevent any moisture from being contained therein. However, from time to time moisture is found in the refrigeration system and this moisture often freezes, stopping the circulation of refrigerant and causing the compressor to operate continuously.

Refrigeration systems also employ some type of means for restricting the flow of refrigerant therethrough. This restrictor may comprise a valve of particular type or may comprise a capillary tube. This tube is of substantial length so as to provide the necessary restriction to the refrigerant passing therethrough.

The object of the present invention lies in combining the capillary tube and the drier and in thus producing a restricting means which has the property of drying the refrigerant passing therethrough. Thus the drier may be added to the system at an extremely low cost as various parts previously required may be eliminated.

A feature of the present invention lies in the provision of an elongated tube which is filled with material capable of absorbing moisture. The refrigerant may pass through the tube although the flow of refrigerant through the tube is restricted. As a result the fluid is subjected to drying material spread throughout a long length of tube, therefore efficiently removing any moisture therefrom.

Driers used in refrigerant systems usually comprise tubular bodies having a screen or other filter means at each end and having water absorbent material confined between the screens. A connection is provided at each end of the tubular body so that the drier may be connected to the tubular conduit or refrigerant coil. As pressure exists within the system the drier must be capable of withstanding such pressure and must be completely air tight. The capillary tube is also provided with some type of connection at each end so as to connect the same to the remainder of the system. By merely using screens at opposite ends of the capillary tube and by using instead of the extremely small diameter capillary tube, a somewhat larger diameter tube containing material which acts to absorb moisture, a combined drier and restrictor is provided at an extremely low cost.

A feature of the present invention lies in the fact that the drying material is located at a portion of the system where the refrigerant is in a liquid state. The refrigerant is normally in a gaseous state as it leaves the refrigerant coil and is compressed by a suitable compressor to a high pressure. This fluid under pressure is passed through a condenser in which the gas is condensed and forced through the restrictor. By locating the drying material at this point of the system, the moisture is removed before being carried into the refrigerant coils, thus eliminating much of the opportunity for the moisture to freeze.

These and other objects and novel features of our invention will be more clearly and fully set forth in the following specification and claims.

In the drawings forming a part of our specification:

Figure 1 diagrammatically illustrates a refrigerant system showing our combined restrictor and drier in use therein.

Figure 2 is a sectional view through the ends of the refrigerant restricting tube showing the location of the screens.

Figure 3 is a perspective view of one of the screens showing the general construction thereof.

The refrigerant system is in most respects a conventional type of system and is shown as including a compressor 10 which is connected by a tubular connection 11 to a condenser 12. The condenser 12 is connected by a tubular connection 13 to a connection 14 leading to the combined restrictor and drying tube 15. A connection 16 is provided at the opposite end of the tube 15 for connecting the tube 15 with the evaporator coil 17. As the refrigerant leaves the restrictor 15 it expands and evaporates, thereby cooling the coils 17.

The coil 17 is connected at 19 to an accumulator 20 which is designed to remove oil and the like from the refrigerant. The accumulator 20 is connected at 21 to the return line 22 leading to the intake of the compressor 10.

The coil 15 in many refrigerant systems comprises a capillary tube which is of sufficiently small internal diameter to restrict the flow of refrigerant so as to produce the desired expansion into the evaporator coil 17. In the present instance the coil 15 is of somewhat larger diameter than usual and the coil is filled with material capable of removing moisture from the fluid. This material is indicated in general by the numeral 23 and this material may be silica gel, or other suitable means capable of withdrawing moisture from fluid passing therethrough.

The filling of the tube 15 with silica gel tends to restrict the flow of refrigerant through the tube, thereby creating the necessary restrictive effect on the flow of refrigerant through the coil. At the same time the refrigerant is subjected to the action of the drying material over an elongated path, thereby creating an efficient and effective moisture removing means.

It will be understood that if the drier is of relatively large diameter, it is possible for fluid to pass through the drier without coming into intimate contact with particles of material capable of removing moisture if parts of the moisture removing material are already saturated with moisture. There is a tendency for the liquid to pass from one end to the other of the drier and need not contact the silica gel or other material which is not already saturated. Thus after the silica gel has absorbed a substantial amount of moisture it is possible that the drier will not be entirely effective even though all of the silica gel has not absorbed its fullest amount of moisture. However, where the silica gel is supported in a long tube of relatively small diameter there is a definite assurance that the drier will operate most effectively.

The connections at opposite ends of the tube 15 are best illustrated in Figure 2 of the drawings. The ends of the tube are provided with fittings indicated in general by the numerals 24 and 25 and which are sealed with respect to the ends of the tubes. Screens such as 26 are supported in either end of the tube 15 to retain the silica gel within the tube. The screens 26 include a sealing collar 27 at one end thereof which acts to hold the tubular screen body expanded to its full circumference. The collar 27 is provided with a reversely turned end 29 which encloses a cylindrical end 30 of the screen and is sealed with respect thereto.

The other end 31 of the tubular screen is flattened as indicated in the drawings and the opposite sides of the screen are sealed together to form an effective seal. The flattened ends 31 of the screens are extended into the ends of the tube 15 and the collars 27 may abut the ends of the tube or may fit within the same and act to retain the silica gel or other moisture absorbing material from the refrigerant.

We have found that our construction results in increased economy of construction as the body of the drier and the connections at opposite ends thereof may be eliminated. By placing the moisture absorbing material in a relatively larger diameter tube a restrictor is formed which is equivalent in restricting ability to a capillary tube of smaller internal diameter and has the secondary advantage of drawing the moisture from the refrigerant.

While the exact proportions of our restrictor are not of importance in the present invention, as an example of a restrictor construction which has been found practical in actual use, we have found that seven feet of one-quarter inch copper tubing is practical for use. This seven foot length of tubing is filled with twenty-five grams of fourteen to twenty mesh silica gel, commercially known as the PA-100 type produced by the Davidson Company. This amount of silica gel in a tube of the stated length and diameter has been found to provide the necessary restriction and also to act effectively as a drier to remove water from the refrigerant.

As indicated in Figure 1 of the drawings, the restrictor 15 may be in heat exchange relation to the suction line 22 if desired. As indicated in this figure the restrictor 15 extends closely adjacent the suction line, and may be soldered or otherwise thermally affixed to it for cooling the fluid within the restrictor. The extremely cool refrigerant gas within the suction line 22 absorbs heat from the liquid within the restrictor, thus increasing the efficiency of the system. For example, about five feet of the restrictor may be soldered to the suction line 22 or may be fixed in heat exchange relation thereto.

In accordance with the patent statutes, we have described the principles of construction and operation of our combination drier and restrictor for refrigeration systems, and while we have endeavored to set forth the best embodiment thereof, we desire to have it understood that obvious changes may be made within the scope of the following claims without departing from the spirit of our invention.

We claim:

1. A refrigerant system including a compressor, a condenser connected thereto, an evaporator, and a combined restrictor and drier unit connected between the condenser and the evaporator, said unit forming the sole means of restricting the passage of refrigerant to the evaporator, and a suction line connecting the evaporator and the compressor, said unit comprising an elongated chamber of a diameter smaller than the internal diameter of the suction line, said chamber containing material capable of absorbing moisture, the small diameter of the chamber and the obstruction created by the moisture absorbing material combining to create sufficient pressure drop between the ends thereof to obviate the necessity of further restriction.

2. The structure defined in claim 1 and including means for confining the material within the chamber.

3. The structure defined in claim 1 and in which moisture absorbing material is granular in form, and including means to confine the material within the chamber.

4. The structure defined in claim 1 and including foraminous members at each end of said chamber, said members comprising elongated tubular screen bodies secured about their periphery to said chamber at one end of each body, and flattened at the other end of each body.

RUSSELL W. AYRES.
DONALD F. SWANSON.

REFERENCES CITED

The following references are of record in the file of this patent:

UNITED STATES PATENTS

| Number | Name | Date |
| --- | --- | --- |
| 2,279,928 | Shoemaker | Apr. 14, 1942 |
| 2,430,692 | Touborg | Nov. 11, 1947 |
| 2,434,118 | Newman | Jan. 6, 1948 |
| 2,446,853 | Savidge | Aug. 10, 1948 |
| 2,548,643 | Whitney | Apr. 10, 1951 |

FOREIGN PATENTS

| Number | Country | Date |
| --- | --- | --- |
| 178,240 | Germany | Nov. 13, 1906 |
| 624,965 | Great Britain | June 20, 1949 |

(Convention date Aug. 7, 1946)